W. W. IRWIN.
TROLLEY.
APPLICATION FILED NOV. 23, 1910.
997,135.
Patented July 4, 1911.
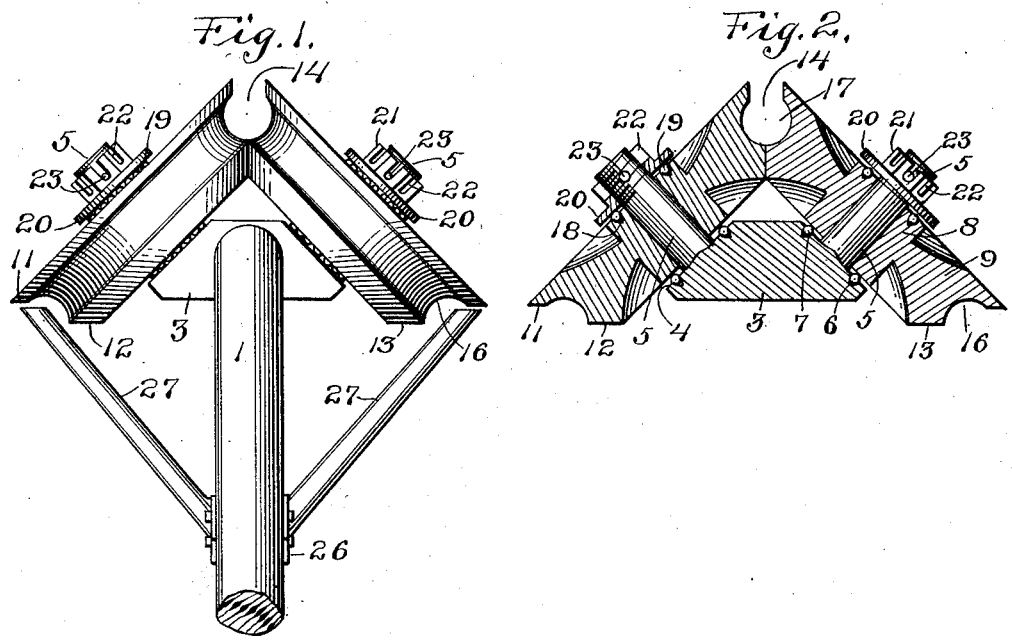
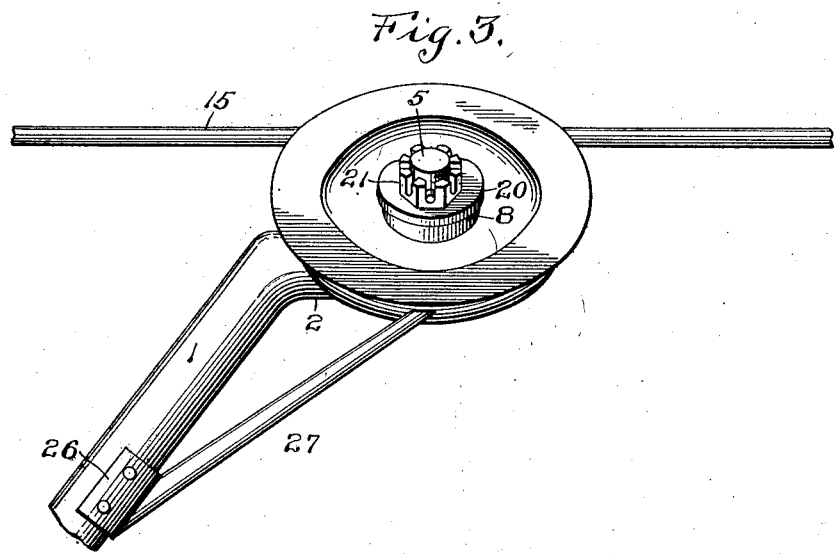
WITNESSES
INVENTOR
W. W. Irwin,
By
Attorneys

UNITED STATES PATENT OFFICE.

WALTER W. IRWIN, OF EL PASO, TEXAS.

TROLLEY.

997,135. Specification of Letters Patent. Patented July 4, 1911.

Application filed November 23, 1910. Serial No. 593,802.

*To all whom it may concern:*

Be it known that I, WALTER W. IRWIN, a citizen of the United States of America, residing at El Paso, in the county of El Paso and State of Texas, have invented certain new and useful Improvements in Trolleys, of which the following is a specification, reference being had therein to the accompanying drawing.

This invention relates to trolleys, and the primary object of the invention is the provision of positive and reliable means in a manner as will be hereinafter set forth for retaining a trolley wheel upon a trolley wire or electric conductor, whereby the same cannot become accidentally displaced while a car or other vehicle is rounding a curve, passing over a switch, crossing, or encountering an irregular section of railway.

Another object of this invention is to furnish a trolley pole with a compound trolley wheel arranged whereby it can be easily and quickly removed from the trolley wire by the operator of the car, and normally remain in engagement with the wire without interfering with or injuring the overhead construction of electric railway systems.

A further object of the invention is to obtain the above results by a trolley wheel that is serviceable, capable of being renewed or repaired, strong and durable, inexpensive to manufacture, and highly efficient for the purposes for which it is intended.

The above objects are attained by a mechanical construction that will be hereinafter specifically described and then claimed, and reference will now be had to the drawing forming part of this specification, wherein there is illustrated a preferred embodiment of the invention, but it is to be understood that the structural elements thereof are susceptible to such changes as fall within the scope of the appended claim.

In the drawings: Figure 1 is a front elevation of the trolley. Fig. 2 is a cross sectional view of the same, and Fig. 3 is a side elevation of the trolley.

In the drawings, the reference numeral 1 denotes a trolley pole having the upper end thereof bent rearwardly, as at 2, and provided with a frusto-conical shaped head 3 provided with two diametrically opposed and angularly disposed cylindrical pins 5, the inclined surface 4 of the head 3 surrounding the pins 5 having a ball race 6, V-shaped in cross section, said race accommodating anti-friction balls 7.

Revolubly mounted upon each of the cylindrical pins 5 is the hub 8 of a trolley wheel 9, the lower end of said hub bearing upon the anti-friction balls 7. The wheel 9 can have a solid body or spokes, and has two peripheral flanges 11 and 12, the former being of greater diameter than the latter and of a less thickness, the flange 12 having a contacting or bearing surface 13 to engage or move in proximity to the corresponding flange of the other trolley wheel. The difference in diameter between the two flanges 11 and 12 presents a slot 14 at the top of the trolley, this slot providing clearance for a trolley wire or electric conductor 15, and it is against or upon this wire or conductor that the wheels 9 are adapted to travel, the flanges 11 and 12 providing a circumferentially arranged groove 16 and these grooves confront one another and provide a pocket 17 for the wire or conductor 15.

The outer end of the hub 8 has a V-shaped ball race 18 for anti-friction balls 19, said balls being retained in the race by the annular flange 20 of a nut 21, said nut having a plurality of radially disposed slots 22 for a cotter pin 23, and said pin extending through the end of the pin 5 and diametrically opposed slots 22, thus preventing the nut 21 from rotating or becoming accidentally displaced from the pin 5.

Clamped to the under side of the trolley pole 1 below the bifurcation thereof is a semi-cylindrical sleeve 26 having two oppositely disposed upwardly extending guide arms 27, the upper ends of said arms extending into the groove of the trolley wheels. The function of the arms 27 in connection with the trolley is to prevent the wire 15 from getting under the wheels should the wheels be accidentally displaced from the wire through faulty supports for the wire. When a trolley is accidentally displaced from the wire, the pole naturally flies upward or to a vertical position and unless the car is stopped, remains in such position until the next cross wire or support is reached, and is then, by the motion of the car, forced down and under the cross wire or support. At the moment of passing under the cross wire, the arms 27 guide the wheels away from the main wire and thus prevent hanging. The arms in view of the construction disclosed are necessary to prevent hanging and perhaps breaking of main wires and supports, in such a case of accidental displacement as above described.

From the foregoing it will be observed that the wheels 9 can freely revolve upon the pins or spindles 5 and that in the manner in which the wheels are arranged it will be practically impossible for the trolley to become displaced from the wire or conductor 15.

What I claim, is:

A trolley comprising a pole, an angularly-disposed head carried at the upper end of the pole, said head being substantially of frusto-conical shape, diametrically opposed and angularly-disposed pins projecting from the sides of the head, angularly-disposed trolley wheels having the hubs thereof revolubly mounted upon the pins, means for retaining the trolley wheels upon the pins, said trolley wheels having peripheral flanges with the outer flanges of greater diameter than the inner flanges whereby said flanges will present a pocket between the upper edges of said wheels to accommodate a trolley wire, a semi-cylindrical sleeve secured to said pole, and a pair of oppositely-disposed upwardly-extending inclined guide arms projecting from said sleeve and each extending in a groove of said wheel.

In testimony whereof I affix my signature in the presence of two witnesses.

WALTER W. IRWIN

Witnesses:
MARY CHRISTY IRWIN,
GEO. B. OLIVER.